United States Patent [19]
Kober

[11] 4,183,086
[45] Jan. 8, 1980

[54] COMPUTER SYSTEM HAVING INDIVIDUAL COMPUTERS WITH DATA FILTERS

[75] Inventor: Rudolf Kober, Munich, Fed. Rep. of Germany

[73] Assignee: Siemens Aktiengesellschaft, Berlin & Munich, Fed. Rep. of Germany

[21] Appl. No.: 870,756

[22] Filed: Jan. 9, 1978

[30] Foreign Application Priority Data

Jan. 28, 1977 [DE] Fed. Rep. of Germany ....... 2703559

[51] Int. Cl.² .................. G06F 15/16; G06F 13/00
[52] U.S. Cl. .................................................. 364/200
[58] Field of Search ... 364/200 MS File, 900 MS File

[56] References Cited
U.S. PATENT DOCUMENTS

| | | | |
|---|---|---|---|
| 3,761,879 | 9/1973 | Brandsma | 364/200 |
| 3,815,095 | 6/1974 | Wester | 364/200 |
| 3,967,247 | 6/1976 | Andersen | 364/200 |

*Primary Examiner*—James D. Thomas
*Attorney, Agent, or Firm*—Hill, Van Santen, Steadman, Chiara & Simpson

[57] ABSTRACT

A computer system which is made up of a number of individual computers and which has a system bus for transmitting data among the individual computers, has a data filter interposed between the system bus and the individual computers which allows communication between the system bus and one of the individual computers only when that computer is being accessed.

9 Claims, 3 Drawing Figures

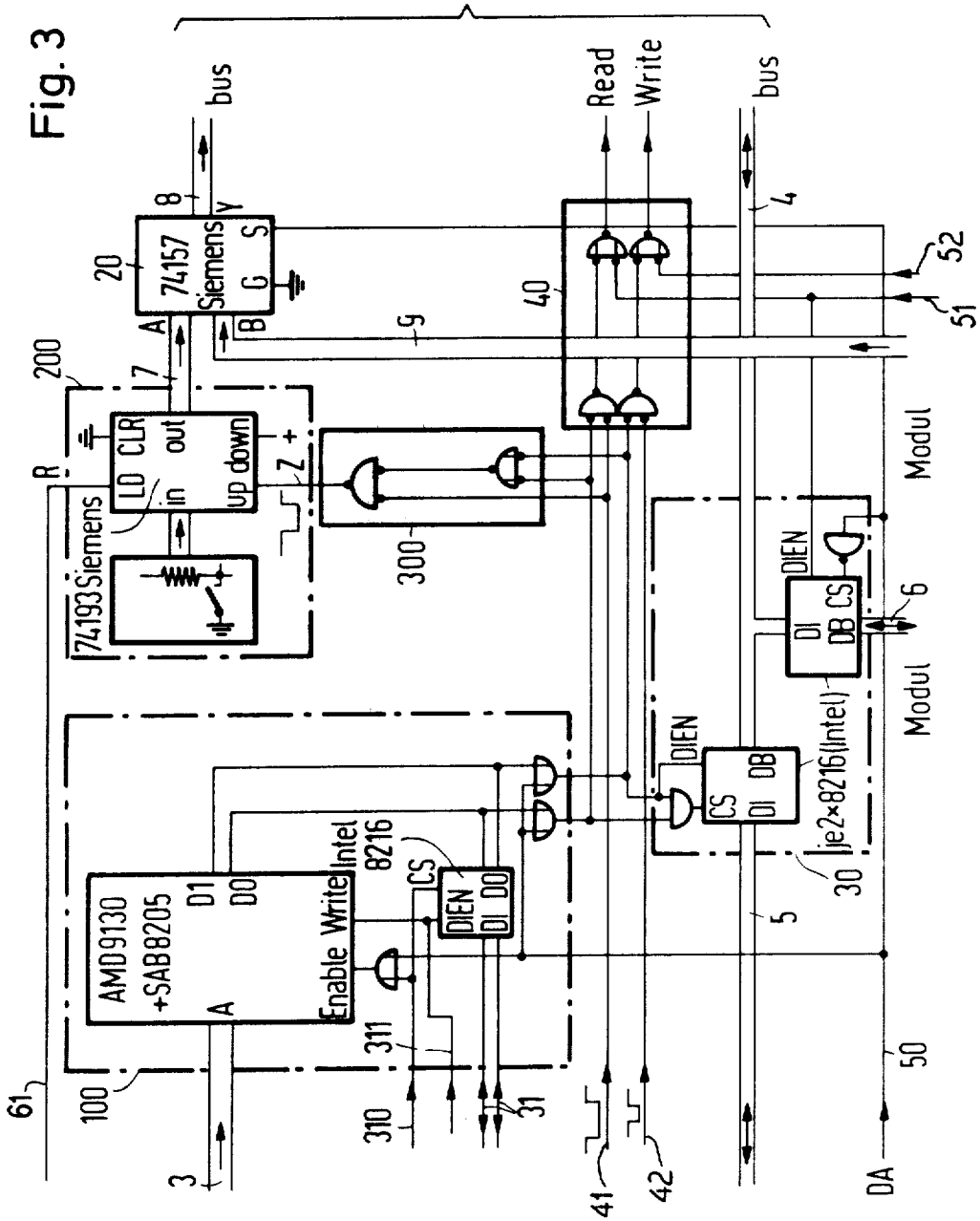

4,183,086

COMPUTER SYSTEM HAVING INDIVIDUAL COMPUTERS WITH DATA FILTERS

BACKGROUND

1. Field of the Invention

The present invention relates to a computer system in which a number of individual computers are interconnected by means of a system bus, and more particularly to apparatus for improving the efficiency of communication between the system bus and the individual computers.

2. The Prior Art

A computer system of the type having a number of individual computers interconnected by means of a system bus has been described in copending application of Rudolf Kober et al. U.S. Ser. No. 732,988, filed Oct. 15, 1976. In a computer system of the kind described in that application, the entire data traffic between the individual computers takes place by way of the system bus. Each of the individual computers has a read-write memory serving as the coupling link between that computer and the system bus. During operation of the system, data is transmitted by way of the system bus and the associated addresses by way of the system address bus. The data exchange between the individual computers and the system bus is performed by the read-write memory associated with each of the individual computers. Typically, data which is intended for one of the individual computers is entered into the read-write memories of all of the individual computers.

A central control computer establishes a data path which reads from a selected read-write memory of one of the individual computers to the read-write memories of all of the other individual computers. This operation is repeated for data generated by any of the individual computers. It therefore follows that all of the read-write memories contain at many times the same data, even if only one or a few of the individual computers need such data. For many specific computer operations, the proportion of the data required by any individual computer is relatively small. When, as in the past, the read-write memories of the individual computers have sufficient capacity to maintain in storage all of the data transmitted over the system bus, a relatively large capacity for each of the read-write memories is required. It is desirable to provide apparatus for making it possible to reduce the required capacity of the read-write memories associated with the individual computers.

BRIEF DESCRIPTION OF THE INVENTION

It is a principal object of the present invention to provide a computer system in which the read-write memories of the individual computers may have a substantially reduced capacity.

This object is accomplished in the present invention by providing a data filter between the system bus and each of the read-write memories of the individual computers, which data filter passes to the individual read-write memories only the data required for its associated computer. In the other direction, the data filter transmits onto the system bus data produced by individual computers which are required by other individual computers. In this manner, it is possible to reduce the capacity requirements of the read-write memories associated with the individual computers.

In a preferred embodiment of the present invention, an associative memory is provided for each of the read-write memories of the individual computers, such associative memory having or containing addresses associated with data words which are actually required for its associated read-write memory. Also stored with each address, is an individual read-write characteristic, and a storage location address which assigns a storage location in the respective read-write memory to the data word associated with the stored address. When the associative memory is accessed, with a particular address, the associative memory produces an output indicating that the address is contained in the associative memory, and also produces a read-write command for controlling its read-write memory.

In a first preferred variation of the data filter of the present invention, the associative memory stores the storage location associated with the access address (sometimes hereinafter referred to as a recognition word with the read-write command). As a result, a storage location address is permanently allocated to each recognition word. In this variation of the invention, a relatively large storage capacity is required for the associative memory, because of the need for storing the storage location addresses. Since the presently available associative memory units have a relatively small capacity, the first preferred variation of the data filter of the present invention is preferred only in cases where there is a relatively small number of accesses to each of the read-write memories.

In a second preferred variation of the present invention, a digital counter is provided for counting successive address recognitions by the associative memory, with the current value of the counter conveyed to the read-write memory as a storage location address. In this way a storage location address is allocated to each recognition word, but there is no permanent association between the recognition word address and the storage location address. In the second variation, the storage location address may be said to be generated by a stack pointer. A reproducible association between the addresses accessing the associative memory and the storage location addresses can be achieved by a defined exchange process, for example, by establishing an initial value for the counter (the stack pointer) and of the sequence of applied addresses. In the second variation, substantially less storage capacity is required for the associative memory, since only recognition words, together with the read-write commands, are required to be stored.

In a particularly advantageous embodiment of the second variation, the associative memory is directly addressable by the access addresses, so that only one write and one read mark need be stored in each of the storage locations of the associative memory. Thus, each recognition word consists solely of a read mark or a write mark, so that only two bits need be stored for each storage location in the associative memory.

In another embodiment of the present invention, each recognition word is composed of an address and a read-write command, with the recognition words being arranged in such a way that access to the associative memory will produce a block address, so that block transfers of data between the read-write memories of the individual computers and the system bus are possible. This is especially advantageous with the computer systems of the kind described in the aforementioned application, where several read-write memories are present. The entire address space of the computer system can then be subdivided into blocks individually assigned to the various read-write memories. The associative memory assigned to a specific read-write memory needs to contain only the addresses of the data blocks required by its corresponding read-write memory. All data belonging to a given block are then transferred by either reading or writing, depending on the read-write command.

The foregoing and other objects and advantages of the present invention will become manifest by an examination of the following description and the accompanying drawings.

SUMMARY OF THE DRAWINGS

Reference will now be made to the accompanying drawings in which:

FIG. 3 is a functional block diagram, partly in schematic circuit diagram form, of the apparatus of FIG. 2 using commercially available components.

Referring now to FIG. 1, the components making up the data filter are enclosed in the dashed line 1. It is connected with a read-write memory 2 for an individual computer (not shown). The data filter contains an associative memory 10, an address branching switch 20, a data branching switch 30, and a logic unit 40. Within the associative memory, the stored words are divided into three parts, indicated in FIG. 1 by the sections 11, 12 and 13 of the associative memory 10. The first section 11 represents the access address, the second portion 12 represents the read-write command, which determines whether a data word is to be read from the read-write memory 2 or is to be written into it. The parts 11 and 12 of each stored word represent together a recognition word. The third portion indicated by section 13 of the associative memory 10 indicates the storage location address for a data word in the read-write memory 2.

Figure 1:
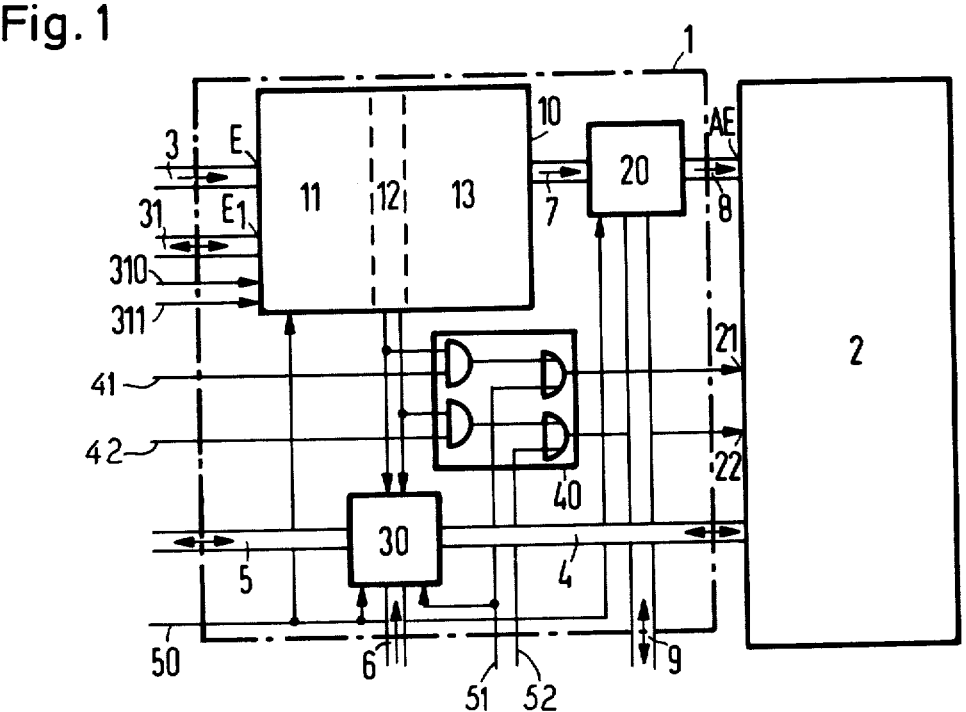
FIG. 1 is a functional block diagram of a first variation of a data filter incorporating the present invention.

The system address bus 3 is connected to the associative memory 10 at terminal E, and access addresses appear on the system address bus 3. An access address present at input E is simultaneously compared with all addresses stored in section 11 of the associative memory 10 and if the access address is present in the associative memory 10, the comparison is immediately recognized, together with the storage location address stored in section 13 of the associative memory 10.

Upon recognition, either a read or a write signal is read out of the section 12 of the associative memory 10, and controls operation of the gates within the logic unit 40, to energize either the read input 21 or the write input 22 of the read-write memory 2. Lines 41 and 42 are connected as inputs to the gates within the logic unit 40 in order to furnish timing pulses required for the read and write functions.

The output from the section 12 of the associative memory 10 also controls the branching switch 30 to be switched to allow the data bus 5 to be interconnected with the data bus 4 which is directly connected with the data input-output terminals of the read-write memory 2.

Simultaneously, the storage location address stored in section 13 of the associative memory 10 is supplied to the address bus 7 and is conveyed by the branching switch 20 to the address bus 8 of the read-write memory 2, to access the appropriate location of the read-write memory 2. A data word on the bus 5 is then written into the storage location of the read-write memory 2 identified by the address on the bus 8, or else a word is read from that same storage location onto the data bus 5, depending on the significance of the output from section 12 of the associative memory 10. The bus 3 is connected with the system address bus and the bus 5 is connected with the system data bus, to allow the read-write memory 2 to communicate with the rest of the system.

The individual computer associated with the read-write memory 2 communicates with it by means of buses 6 and 7. In order to permit access to the read-write memory 2 from its individual computer, the branching switch 30 is switched over to allow interconnection between the buses 6 and 4, to allow data to be read to and from a read-write memory 2. At the same time, the branching switch 20 is switched over to allow communication between the buses 8 and 9, to allow the individual computer to address individual storage locations of the read-write memory 2. The direction of the branching switches 20 and 30 is controlled by the individual computer by a control line 50. Read and write signals are produced by the individual computer and are connected to the lines 51 and 52 which are connected at its inputs to the gates in the logic unit 40, to produce appropriate read and write control signals on the terminals 21 and 22.

In the embodiment of FIG. 1, thirty-three bits of storage are required for each access address, when the access address is sixteen bits in length, the storage location address is sixteen bits, and one bit is required for the read-write command. Since the presently available associative memory units have a relatively small capacity, the embodiment of FIG. 1 is most practical only in cases where a small number of access addresses are employed. The embodiment of FIG. 1 is practical when ten or less access addresses are required.

Figure 2:
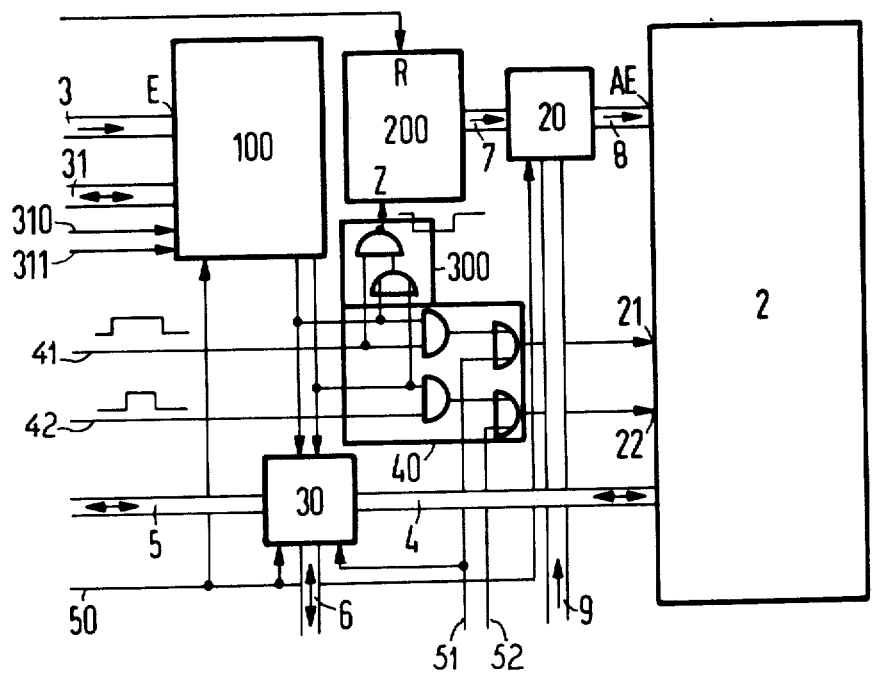
FIG. 2 is a functional block diagram of a second variation of the present invention.

If the system requires the capacity for exchanging more data, the second variation illustrated in FIGS. 2 and 3 is to be preferred. In the arrangement of FIG. 2, the associative memory 100 stores only the recognition words, and a counter 200 is provided for identifying storage location addresses. An additional gate unit 300 is also provided. Other units, which have reference numerals corresponding to the numerals used in FIG. 1, have the same function.

In operation of the apparatus of FIG. 2, the only difference from the operation described in connection with FIG. 1 consists in the association between the access addresses and the storage location addresses. Unlike the arrangement of FIG. 1, there is no permanent association between access addresses and storage location addresses. The storage location address is generated by the counter 200, which functions as a stack pointer. In operation, the associative memory 100 compares the access addresses present at the input E with the stored recognition words and checks them for agreement. When a comparison is found, the read-write mark contained within the recognition word opens the logic unit 300 timed by a pulse on line 41, so the state of the counter 200 is advanced by one by a pulse applied to its counting input Z, the incrementing occurring at the trailing edge of the pulse. The content of the counter 200 is then used as the storage location address, and this is applied to the bus 7. The counter 200 can be reset by a reset pulse supplied on the line 61 to the input R, to a preselected initial value. A reproducible association between access addresses and storage location addresses is achieved by a defined exchange process in which the initial value of the counter 200 is established, and the sequence of the applied addresses is also established.

In the arrangement of FIG. 2, the hardware requirement is reduced in comparison with FIG. 1, since it is sufficient to store only the access addresses and a read-write mark in the associative memory 100. The hardware requirement can be further reduced if the associative memory 100 is replaced by a direct access memory or a programmable logic array which is directly responsive only to certain addresses present on the address bus 3. In that case, it is sufficient to store only recognition words consisting of a two-bit read-write mark in the associative memory. The associative memory may be replaced with a directly addressable two-bit wide direct access memory which covers the entire address space, and for each address space, reads out either a write command, a read command, or no command, for each access address. In one embodiment, the recognition word may be one of the following:

00:—no data transfer
01:—write in
10:—read out

In a system in which the associative memory need not be altered, the direct access memory may be a fixed value memory such as an ROM. It may also be a programmable logic arrangement.

When the embodiment of FIG. 2 is used for block transmission of data, each storage location within the read-write memory 2 has a block address and an individual address. The associative memory 100 contains and compares only the addresses of data blocks. When a comparison of an access address for a data block is found, the individual address is employed, as well as the block address, the access an individual storage location of the read-write memory 2.

Referring now to FIG. 3, there is shown a more specific illustration of an embodiment of the present invention as described in connection with FIG. 2. Commercially available components are used for the various parts of FIG. 2. The associative memory 100 is made up of a read-write memory of 128K capacity, storing 64K words of two bits each. In a typical embodiment, the read-write memory is integrated circuit type AMD 9130, commercially available from Advanced Micro Devices, and address decoders type SAB 8205, commercially available from Siemens. The associative memory also contains a bi-directional four-bit bus driver type Intel 8216, commercially available from Intel. The data branching switch 30 is composed of four of the 8216 units, two of which are used to interconnect the eight-bit bus 5 with the eight-bit bus 4, and the other two interconnecting the buses 6 and 4. The counter 200 comprises a sixteen binary bit counter such as type 74 193 commercially available from Siemens. The counter may be preset to an address selected with sixteen single pulse, single throw switches, one of which is illustrated diagrammatically at 201, in response to a load pulse arriving on the line 61. The setting of the switches 201 determines the initial address of the counter 200. A pull-up resistor 202 is provided for each of the switches, so that the voltage level at each input of the counter 200 is established.

The address branching switch 20 comprises a sixteen-fold 2:1 multiplexer, which is made up of four type 74 157 quad 2:1 multiplexers commericially available from Siemens. Other logic gates provided are illustrated in conventional fashion.

In operation, the apparatus of FIG. 3 functions in the same manner as the apparatus of FIG. 2, except that because of the size of the memory unit AMD 9130, every address on the address bus 3 is a possible access address. Access addresses are identified by recognition words which are either 01 or 10, which furnish output pulses on the terminals D0 and D1, in order to trigger incrementing of the counter 200 by virtue of the logic unit 300, and the read-write functions of the individual read-write numbering (not shown).

In order to enhance system flexibility, it is desirable that the associative memory of the various embodiments described above be selectively alterable.

In the foregoing, the present invention has been described in such detail as to enable those skilled in the art to make and use the same. It will be evident that various modifications and additions may be made by those skilled in the art without departing from the essential features of novelty thereof, which are intended to be defined and secured by the appending claims.

What is claimed is:

1. A computer system comprising a system bus having a system address bus and a system data bus, a plurality of individual computers, a plurality of read-write memories, one for each individual computer, each of said read-write memories being coupled with its individual computer and with said system data bus, and a plurality of data filters, one for each of said read-write memories, each of said data filters being connected with its read-write memory and with said system address bus and responsive to addresses on said system address bus for selectively interconnecting said read-write memory with said system data bus, said system address bus supplying an access address to said data filter, said data filter comprising an associative memory for storing recognition words, each of said recognition words corresponding to a data storage location of said read-write memory, means for addressing said data storage locations, means for conveying the address of said data storage location to said read-write memory when an access address supplied to said associative memory from said system address bus corresponds to the corresponding recognition word, and means responsive to a recognition word for supplying a read-write command to said read-write memory.

2. Apparatus according to claim 1, including a digital counting circuit for counting successive address recognitions in the associative memory, said counting circuit having a counting input connected to said associative memory and an output connected to the address input of said read-write memory, and means for supplying the content of the counting circuit to the read-write memory as a storage location address, whereby a storage location address is assigned to each recognition word.

3. Data filter according to claim 2, wherein said associative memory is directly addressable by the system address bus, said associative memory storing only one write or read mark in each storage location corresponding to an access address.

4. Apparatus according to claim 2, wherein each access address is composed of a block address individually assigned to the read-write memory, and of an individual address individually assigned to a storage location.

5. Apparatus according to claim 1, wherein each recognition word consists of an access address and a read-write mark.

6. Apparatus according to claim 1, wherein the content of the associative memory is selectably alterable.

7. Apparatus according to claim 1, including an address branching switch connected between said associative memory and said read-write memory, said address switch adapted to transmit storage location addresses from the data filter to the read-write memory when said switch is in one condition, and to transmit storage location addresses from said individual computer to the read-write memory when said switch is in another condition.

8. Apparatus according to claim 1, including a bidirectional data branching switch connected between said system data bus and said read-write memory, for establishing a data path between said system bus and the read-write memory when said switch is in one condition, and for establishing a data path between said individual computer and said read-write memory when said switch is in another condition.

9. Apparatus according to claim 1, wherein a storage location address is stored with each recognition word, as a result of which a storage location address is permanently assigned to each recognition word.

* * * * *